US007164800B2

(12) United States Patent
Sun (10) Patent No.: US 7,164,800 B2
(45) Date of Patent: Jan. 16, 2007

(54) METHOD AND SYSTEM FOR CONSTRAINT-CONSISTENT MOTION ESTIMATION

(75) Inventor: Zhaohui Sun, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 740 days.

(21) Appl. No.: 10/369,967

(22) Filed: Feb. 19, 2003

(65) Prior Publication Data

US 2004/0165781 A1 Aug. 26, 2004

(51) Int. Cl.
G06K 9/36 (2006.01)
H04B 1/66 (2006.01)
H04N 5/14 (2006.01)

(52) U.S. Cl. .................. 382/236; 375/240; 348/699

(58) Field of Classification Search ............. 382/154, 382/236, 107, 238, 201; 345/156, 427, 419; 375/240, 240.12, 240.16, 240.27; 700/29, 700/30, 31, 44; 348/699
See application file for complete search history.

(56) References Cited

U.S. PATENT DOCUMENTS

| 5,241,608 | A | | 8/1993 | Fogel | 382/16 |
|---|---|---|---|---|---|
| 5,471,252 | A | * | 11/1995 | Iu | 348/699 |
| 5,581,276 | A | * | 12/1996 | Cipolla et al. | 345/156 |
| 5,680,487 | A | | 10/1997 | Markandey | 382/291 |
| 5,821,943 | A | * | 10/1998 | Shashua | 345/427 |
| 5,963,664 | A | | 10/1999 | Kumar et al. | 382/154 |
| 6,192,145 | B1 | * | 2/2001 | Anandan et al. | 382/154 |
| 6,219,462 | B1 | | 4/2001 | Anandan et al. | 382/294 |
| 6,507,661 | B1 | | 1/2003 | Roy | 382/107 |

OTHER PUBLICATIONS

Soatto et al., "Reducing "Structure From Motion": A General Framework for Dynamic Vision Part 2: Implemetation and Experimental Assessment", IEEE, vol. 20, No. 9, Sep. 1998, pp. 943-960.*
"On the computation of motion from sequences of images—A review" by J.K. Aggarwal et al., Proceedings of the IEEE, 76:917-935, 1988.
"Performance of Optical Flow Techniques" by J.L. Baron, et al., International Journal of Computer Vision (IJCV), 2(1): 43-77, 1994.
"A taxonomy and evaluation of dense two-frame stereo correspondence algorithms" by D. Scharstein, et al., IJCV, 47(Jan. 2, 2003); 7-42, 2002.

(Continued)

Primary Examiner—Anh Hong Do
(74) Attorney, Agent, or Firm—David M. Woods (57) ABSTRACT

A method for determining motion vectors from one point in one image frame of a scene to corresponding points in at least two other image frames of the scene, wherein the frames are obtained in a capture process utilizing one or more cameras, wherein the method employs an iterative and hierarchical dense motion estimation that computes the geometry-consistent and appearance-consistent motion fields between three images simultaneously by enforcing both a trilinear constraint and a constant-brightness constraint. This method includes the steps of: providing first, second and third images of a scene under perspective projection with unconstrained motion of the camera, wherein points (x',y') and (x",y") in the second and third frames are projections of the same spatial points (x,y) in the first frame; specifying a system of trifocal tensors and optical flow equations that describe point correspondence across the three images; and applying both a geometric constraint of trilinearity and an appearance constraint of constant brightness, thereby utilizing a trilinear constraint and a constant brightness constraint to obtain the pointwise displacement between the three frames simultaneously.

26 Claims, 8 Drawing Sheets

OTHER PUBLICATIONS

"An iterative image registration technique with an application to stereo vision" by B. Lucas, et al. in *Image Understanding Workshop*, pp. 121-130, 1981.

"A three-frame algorithm for estimating two-component image motion" by J. Bergen, et al., *IEEE Trans. On Pattern Analysis and Machine Intelligence (TPAMI)*, 14: 886-896, 1992.

"On the estimation of optical flow: relations between different approaches and some new results" by H. Nagel, et al., *Artificial Intelligence*, 33: 299-324, 1987.

"A computational framework and an algorithm for the measurement of structure from motion" by P. Anandan, *IJCV*, 2:283-310, 1989.

"Algebraic functions for recognition" by A. Shashua. *IEEE Transactions on Pattern Analysis and Machine Intelligence*, 17:449-789, 1995.

"Structure from motion using line correspondences" by M.E. Spetsakis, et al., IJCV, 4: 171-183, 1990.

"Lines and points in three views and trifocal tensor" by R.I. Harley, In IJCV, 22:125-140, 1997.

"Trifocal motion modeling for object-based video compression and manipulation" by Z. sun and A.M. Tekalp. *IEEE Trans. On Circuits and Systems for Video Technology*, 8:667-685, 1998.

* cited by examiner

METHOD AND SYSTEM FOR CONSTRAINT-CONSISTENT MOTION ESTIMATION

FIELD OF THE INVENTION

The invention relates generally to the field of digital image and/or video processing, and in particular to the field of motion estimation between three and more images.

BACKGROUND OF THE INVENTION

Motion estimation is a technique for finding corresponding projection points of the same spatial physical point on a number of image frames. It is a fundamental problem for a wide variety of tasks in digital video processing and vision technologies, such as image alignment and registration, motion segmentation, video filtering, video enhancement, motion compensation for video compression, image based rendering, and 3-D shape recovery.

After years of effort, it still remains as a challenging task, mainly because it is usually an under-constrained and ill-posed problem. Many important factors involved in image formation, such as illumination, object characteristics (shape and texture) and camera projection, are lost during the imaging process. Thus it is desirable to explore valid and consistent constraints, study their applicable domains, and use the right method for a specific task. The more valid and consistent the constraints, the less the ambiguity in the solutions, and the better the approximation to the true motion field.

A large number of schemes have been proposed so far, varying mainly according to the available information, the underlying modeling assumptions, the performance and speed tradeoff, and the implementation details.

Under the assumption of temporally uniform illumination and Lambertian scene surfaces, the projections of the same spatial point on the image frames have the same appearance (intensity or color), and an optical flow equation can be derived for each point. The optical flow equation governs the relationship between the pointwise displacement and the spatial and temporal intensity gradients. This constraint has been applied to motion estimation between two images, and a large number of schemes have been proposed. Selected computational methods can be found in the following book and review papers, *Optic Flow Computation: A Unified Perspective* by A. Singh, IEEE Computer Society Press, 1992, "On the computation of motion from sequences of images—A review" by J. K. Aggarwal et al., *Proceedings of the IEEE*, 76:917–935, 1988. "Performance of Optical Flow Techniques" by J. L. Barron, et al., *International Journal of Computer Vision (IJCV)*, 2(1): 43–77, 1994, and "A taxonomy and evaluation of dense two-frame stereo correspondence algorithms" by D. Scharstein, et al., *IJCV*, 47(1/2/3): 7–42, 2002. However, only one equation is available for both the x and y coordinates at each point, which in turn induces the aperture problem as only the normal components of the motion field can be recovered.

One way to overcome the under-constrained problem is to assume smooth spatial flow. Depending on the choice of support region, motion model, and the way to enforce smoothness, various methods have been proposed. "An iterative image registration technique with an application to stereo vision" by B. Lucas, et al., in *Image Understanding Workshop*, pp. 121–130, 1981, used a constant-brightness constraint over a local 2-D block. A global 2-D affine model (more general than 2-D block motion) was disclosed in "A three-frame algorithm for estimating two-component image motion" by J. Bergen, et al., *IEEE Trans. on Pattern Analysis and Machine Intelligence (TPAMI)*, 14: 886–896, 1992. Regularization was used to enforce a smoothness constraint in "On the estimation of optical flow: relations between different approaches and some new results" by H. Nagel, et al., *Artificial Intelligence*, 33: 299–324, 1987. And motion between two images is estimated by minimizing the least squares difference between two images in "A computational framework and an algorithm for the measurement of structure from motion" by P. Anandan, *IJCV*, 2:283–310, 1989. However, the smoothness constraint may introduce motion blurring and the underlying (usually 2-D) motion model is not always valid.

Another alternative is to recover the epipolar geometry between two frames and match the corresponding point with same intensity on the epipolar line. However, the point-line epipolar constraint is not tight enough to decide the point-point correspondence, especially when there is not enough texture available (e.g., in uniform regions).

A number of patents have been awarded in this area. U.S. Pat. No. 5,241,608, "Method for estimating velocity vector fields from a time-varying image sequence" to S. V. Fogel, disclosed a regularization method for motion estimation, using the optical flow constraint and smoothness constraint. U.S. Pat. No. 5,680,487, "System and method for determining optical flow" to V. Markandey, disclosed a hierarchical multi-resolution flow estimation between two images based on the optical flow equation. U.S. Pat. No. 6,219,462, "Method and apparatus for performing global image alignment using any local match measure" to P. Anandan and M. Irani, disclosed a method for performing parametric image alignment by applying global estimation directly to the local match-measure data. U.S. Pat. No. 6,507,661, "Method for estimating optical flow" to S. Roy, disclosed a method to estimate the optical flow between a plurality of images. In addition, the plane-plus-parallax approach for 3-D motion estimation was disclosed in U.S. Pat. No. 5,963,664, "Method and system for image combination using a parallax-based technique" to R. Kumar et al., and U.S. Pat. No. 6,192,145, "Method and apparatus for three-dimensional scene processing using parallax geometry of pairs of points" to P. Anandan et al.

However, most of the prior art uses two image frames at a time, and enforces the constant-brightness constraint with the smooth flow assumption, which may introduce an aperture problem and a motion blurring problem depending on the image content. The estimated field is usually the optical (apparent) flow, not necessarily the true motion field. So the corresponding points have the same intensity/color on the image frames, but do not necessarily correspond to the same spatial point. Therefore there is a need to enforce a geometric constraint as well, and use the cues of geometry and appearance together to find the true motion.

One fundamental geometric constraint is the trilinear constraint across three images. U.S. Pat. No. 5,821,943, "Apparatus and method for recreating and manipulating a 3D object based on a 2D projection thereof to A. Shashua, disclosed a method to generate information regarding a 3D object from at least one 2D projection of the 3D object by the use of a trifocal tensor. Meanwhile, studies on the use of trifocal representation were also published in scientific and engineering journals. In particular, the trilinear equations first appeared in "Algebraic functions for recognition" by A. Shashua, in *IEEE Transactions on Pattern Analysis and Machine Intelligence*, 17:779–789, 1995. The notion of trifocal tensor and other geometric relations across three images were presented in "Structure from motion using line correspondences" by M. E. Spetsakis, et al., *IJCV*, 4: 171–183, 1990, and "Lines and points in three views and the trifocal tensor" by R. I. Hartley, in *IJCV*, 22:125–140, 1997. And more comprehensive materials on this subject can be found in a book, *Multiple View Geometry in Computer Vision* by R. Harley and A. Zisserman, Cambridge University Press, 2001. The application of the trifocal model in motion estimation and compensation, and video compression and manipulation was studied in "Trifocal motion modeling for object-based video compression and manipulation" by Z. Sun and A. M. Tekalp, appeared in *IEEE Trans. On Circuits and Systems for Video Technology*, 8:667–685, 1998.

What is needed is the use of multiple, but appropriate, constraints in a single optimization to solve for the motion fields between multiple images. In this connection, it is noteworthy that the trilinear constraint has not been used before with the constant-brightness constraint together in a single optimization to solve for the motion fields between three images.

SUMMARY OF THE INVENTION

It is an objective of this invention to design a three-frame motion estimation method that enforces both the geometric constraint as well as the constant-brightness constraint in a single optimization. Using more valid and consistent constraints enables removing the ambiguous solutions and achieving better approximation to the true motion field.

It is another objective of this invention to design an iterative and hierarchical dense motion estimation method that computes geometry-consistent and appearance-consistent motion fields between three image simultaneously.

The present invention is directed to overcoming one or more of the problems set forth above. Briefly summarized, according to one aspect of the present invention, the invention resides in a method for determining motion vectors from one point in one image frame of a scene to corresponding points in at least two other image frames of the scene, wherein the frames are obtained in a capture process utilizing one or more cameras. This method includes the steps of: providing first, second and third images of a scene under perspective projection with unconstrained motion of the camera, wherein points $(x',y')$ and $(x'',y'')$ in the second and third frames are projections of the same spatial points $(x,y)$ in the first frame; specifying a system of trifocal tensors and optical flow equations that describe point correspondence across the three images; and applying both a geometric constraint of trilinearity and an appearance constraint of constant brightness, thereby utilizing a trilinear constraint and a constant brightness constraint to obtain the pointwise displacement between the three frames simultaneously.

The invention further includes a system for determining motion vectors from one point in one image frame of a scene to corresponding points in at least two other image frames of the scene, wherein the frames are obtained in a capture process utilizing one or more cameras. This system includes: means for obtaining first, second and third images of a scene under perspective projection with unconstrained motion of the camera, wherein points $(x',y')$ and $(x'',y'')$ in the second and third frames are projections of the same spatial points $(x,y)$ in the first frame; and a processor for specifying a system of trifocal tensors and optical flow equations that describe point correspondence across the three images and for applying both a geometric constraint of trilinearity and an appearance constraint of constant brightness, thereby utilizing a trilinear constraint and a constant brightness constraint to obtain the pointwise displacement between the three frames simultaneously.

The invention provides an iterative and hierarchical dense motion estimation method for the geometry-consistent and appearance-consistent motion fields between three images simultaneously, with the use of the trilinear constraint and the constant-brightness constraint. It also provides an uncalibrated manifold-plus-parallax approach for dense motion estimation, applicable to both 2-D and 3-D rigid scene under perspective projection with unconstrained camera motion. The advantages of the disclosed method include, without limitation:

1) constraints from different modalities, geometry and appearance respectively, are used in a single optimization for constraint-consistent motion estimation;

2) four independent trilinear equations and two optical flow equations are integrated in an over-determined system at each point $(x,y)$ for four unknown variables $(x',y',x'',y'')$, thus having the potential to alleviate the aperture and motion blurring problems;

3) it provides a manifold-plus-parallax approach to motion estimation, where the trilinear constraint specifies a manifold in $R^4$ best approximating the corresponding points and the constant-brightness constraint helps to alleviate the dependence on the initial points. The manifold-plus-parallax approach may be more effective than the plane-plus-parallax approach, as a manifold is more efficient for nonlinear approximation than a plane;

4) it is applicable to both 2-D and 3-D rigid scenes under perspective projections and unconstrained camera motion. 2-D motions, such as translational motion, affine motion, and perspective motion, are all special cases. The fundamental matrix in epipolar geometry between two image frames can also be derived from the trifocal tensor between three images; and 5) it uses hierarchical and multi-resolution pyramid structures to find geometry-consistent and appearance-consistent dense motion fields across three images simultaneously.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 9A, 9B and 9C show results of the three-frame motion estimation method, where

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
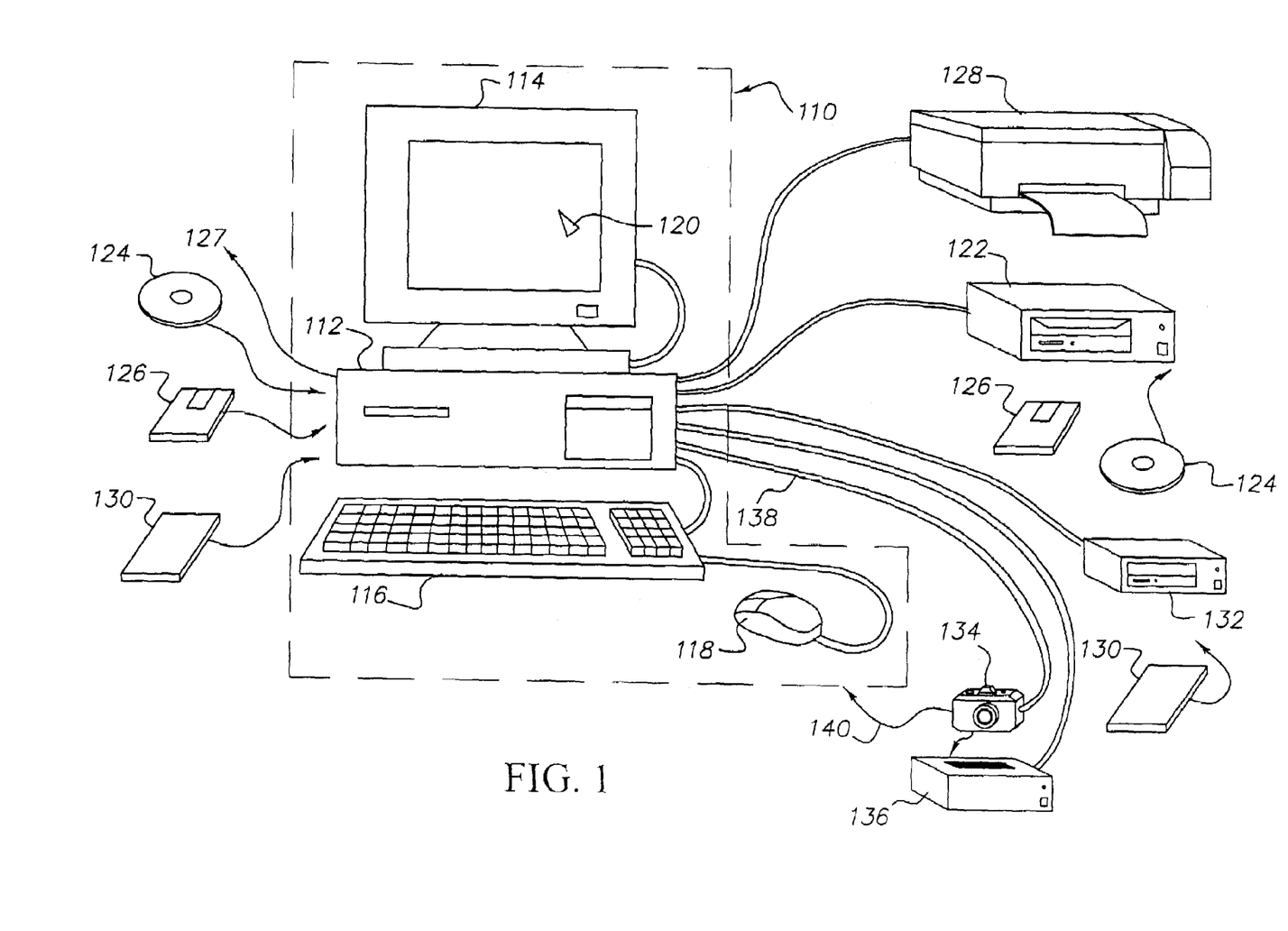
FIG. 1 generally illustrates features of a system useful in implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the images on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera or a scanner (not shown, but could be, e.g., a scanner for scanning an original, such as a silver halide film). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

Figure 2:
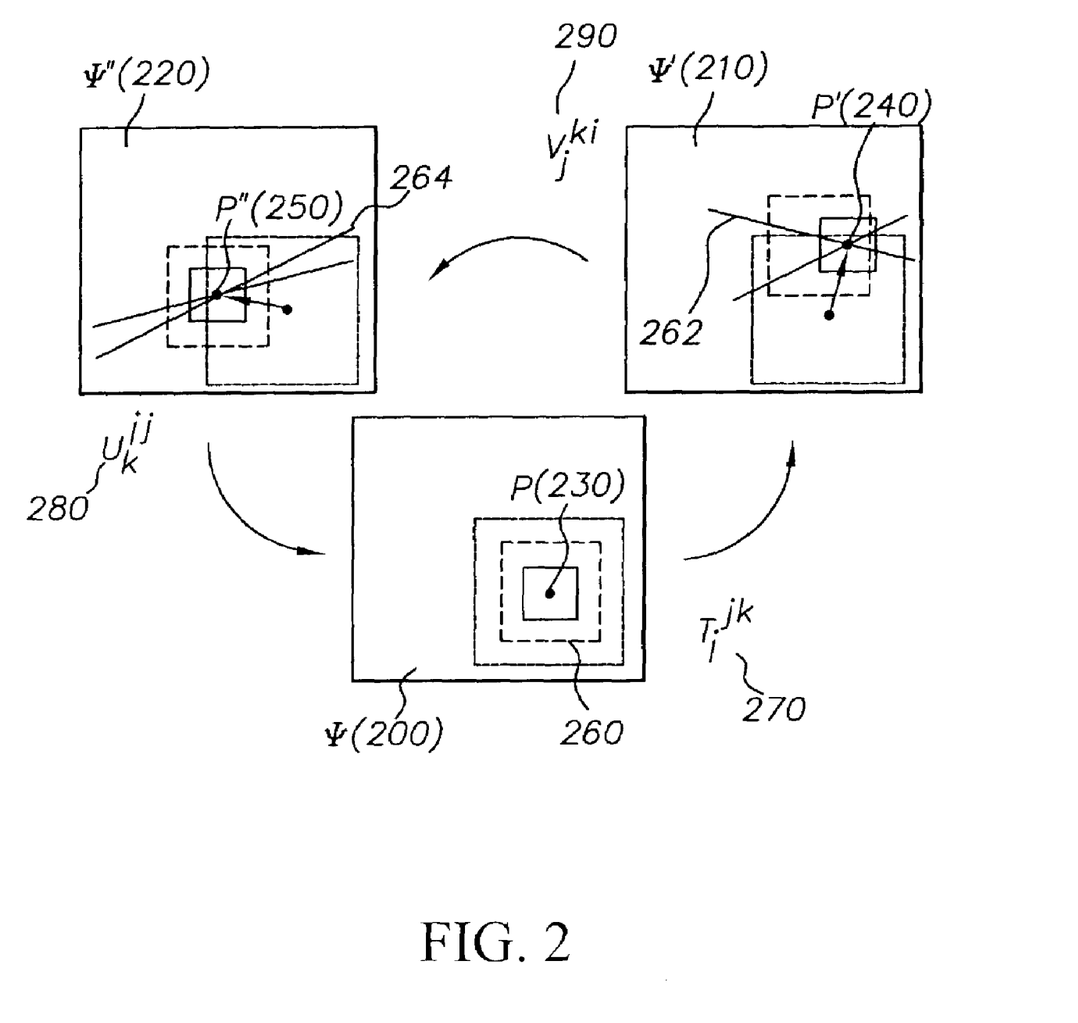
FIG. 2 shows a three-frame approach to geometry-consistent and appearance-consistent motion estimation based on the constraints of trilinearity and constant-brightness, in accordance with the present invention.

Referring now to FIG. 2, the three-frame approach to geometry-consistent and appearance-consistent motion estimation based on the constraints of trilinearity and constant-brightness is illustrated. Given the intensity/color I(x,y), I'(x',y') and I"(x",y") of three image frames ψ, ψ', ψ" for each point p=(x,y,1) 230 (homogeneous coordinate) in ψ 200, we find its corresponding points p'=(x',y',1)$^T$ 240 in ψ' 210 and p"=(x",y",1)$^T$ 250 in ψ" 220 simultaneously, $$f(x, y, I, I', I'', T_i^{jk}) \rightarrow (x',y',x'',y'')$$

where $T_i^{jk}(\psi, \Psi', \psi'')$ 270 is a trifocal tensor across the three frames.

The proposed scheme enforces tight geometric and constant-brightness constraints to find constraint-consistent motion fields. More specifically, we use the trilinear constraints with the constant-brightness constraints to find the pointwise displacement between the three frames simultaneously. Under the general assumptions of 2-D/3-D rigid scene and perspective projection, there are at least 6 equations available at each point (x, y) (4 independent trilinear equations and 2 optical flow equations per color channel), enough to solve for the four unknowns (x', y', x", y").

As motion estimation based on image intensity/color is usually an under-constrained problem, our approach is to enforce tight, valid and consistent constraints of $$p^i l'_j l''_k T_i^{jk} = 0 \qquad (1)$$

$$p''^k l_i l'_j U_k^{ij} = 0 \qquad (2)$$

$$p'^j l''_k l_i V_j^{ki} = 0 \qquad (3)$$

$$I(x,y) = I'(x',y') = I''(x'',y'') \qquad (4)$$

to remove the ambiguities and find the best constraint-consistent approximation to the true motion fields.

Equation (1) is the trilinear constraint across three images, capturing the relation of a point p 230 in $\psi$, a line l' 262 passing (x',y') 240 in frame $\psi'$, and a line l" 264 passing (x",y") 250 in frame $\psi"$. The constraint is purely geometric, regardless of the appearance changes (e.g., illumination and surface characteristics). It is applicable to rigid scene under perspective projection with unconstrained camera motion. Constraints (2) and (3) are redundant as it is just a rotation of frames and symbols. All three tensors, $T_i^{jk}(\psi, \psi', \psi")$ 270, $U_k^{ij}(\psi", \psi, \psi')$ 280, and $V_j^{ki}(\psi', \psi", \psi)$ 290, i,j,k=1, 2, 3, are uniquely determined by the projection matrices of the three cameras, and can be automatically recovered by point correspondences without camera calibration. In practice, especially in uncalibrated cases, tensor estimation from feature correspondences is subject to noise, and the representation of 27 coefficients is an over-parameterization. There are many tensors that may fit the same set of features but lead to different camera matrices. Instead of sophisticated optimization, we use over-determined system and the trifocal tensors estimated from the different trials of random sampling to overcome the potential system bias.

Initial point $(x'_0, y'_0, x"_0, y"_0)$ is still important for fast convergence to the optimal solution. From geometric point of view, only the residue errors, not the estimate errors, can be corrected by the trilinear constraints. From numerical point of view, the solution to nonlinear equations almost always depends on the starting point.

The dependence on the initial points can be minimized by further enforcing the constant-brightness constraint (4), as the projections of the same spatial point have the same intensity/color. It is valid for temporally uniform illumination and Lambertian scene surface with any scene structure and camera configuration (e.g., multiple and deformable motion). There are a total of three optical flow equations per color channel, of which two are independent. In practice, direct application of the constant-brightness constraint is limited by the small motion assumption (for linearization) and the accuracy of the gradient estimates (especially in uniform regions). One solution is to explore smooth spatial motion (e.g., hierarchical block motion) to catch large displacement and gather enough texture information for gradient computation.

Constraints (1–4) are point-based, making the smooth spatial flow assumption and region support unnecessary. Therefore it is possible to alleviate the inherent aperture and motion blurring problems. The constraints are from complementary modalities, geometry and appearance respectively, and a combination of them is useful to remove the ambiguous solutions.

In the following, constraints (1–4) are expanded as an over-determined nonlinear system $f(\Lambda)=0$ with $\Lambda=(x',y',x",y")$. By solving the functions $f(\Lambda)=0$ properly, we can find the geometry-consistent and appearance-consistent corresponding points (x',y') and (x",y") in frames $\psi'$ and $\psi"$.

The point-line-line constraint $p^i l'_j l"_k T_i^{jk}=0$ (1) can be expanded to four independent point-point-point trilinear equations, by choosing a vertical line $l'^1=(1,0,-x')$ and a horizontal line $l'^2=(0,1,-y')$ passing through (x', y') in view $\psi'$, and a vertical line $l"^1=(1,0,-x")$ and a horizontal line $l"^2=(0,1,-y")$ in view $\psi"$ passing through (x", y").

$$f_1: x"T_i^{13}p^i - x"xT_i^{33}p^i + xT_i^{31}p^i - T_i^{11}p^i = 0 \quad (5)$$

$$f_2: y"T_i^{13}p^i - y"xT_i^{33}p^i + xT_i^{32}p^i - T_i^{12}p^i = 0 \quad (6)$$

$$f_3: x"T_i^{23}p^i - x"yT_i^{33}p^i + yT_i^{31}p^i - T_i^{21}p^i = 0 \quad (7)$$

$$f_4: y"T_i^{23}p^i - y"yT_i^{33}p^i + yT_i^{32}p^i - T_i^{22}p^i = 0 \quad (8)$$

Similarly, $p"^k l'_i l'_j U_k^{ij}=0$ (2) can be expanded as the following 4 independent equations.

$$f_5: x'U_k^{13}p"^k - x'xU_k^{33}p"^k + xU_k^{31}p"^k - U_k^{11}p"^k = 0 \quad (9)$$

$$f_6: y'U_k^{13}p"^k - y'xU_k^{33}p"^k + xU_k^{32}p"^k - U_k^{12}p"^k = 0 \quad (10)$$

$$f_7: x'U_k^{23}p"^k - x'yU_k^{33}p"^k + yU_k^{31}p"^k - U_k^{21}p"^k = 0 \quad (11)$$

$$f_8: y'U_k^{23}p"^k - y'yU_k^{33}p"^k + xU_k^{32}p"^k - U_k^{22}p"^k = 0 \quad (12)$$

And $p^{\prime j}l"_k l_i V_j^{ki}=0$ (3) can be written as the following.

$$f_9: xV_j^{13}p^{\prime j} - xx"V_j^{33}p^{\prime j} + x"V_j^{31}p^{\prime j} - V_j^{11}p^{\prime j} = 0 \quad (13)$$

$$f_{10}: yV_j^{13}p^{\prime j} - yx"V_j^{33}p^{\prime j} + x"V_j^{32}p^{\prime j} - V_j^{12}p^{\prime j} = 0 \quad (14)$$

$$f_{11}: xV_j^{23}p^{\prime j} - xy"V_j^{33}p^{\prime j} + y"V_j^{31}p^{\prime j} - V_j^{21}p^{\prime j} = 0 \quad (15)$$

$$f_{12}: yV_j^{13}p^{\prime j} - yy"V_j^{33}p^{\prime j} + x"V_j^{32}p^{\prime j} - V_j^{22}p^{\prime j} = 0 \quad (16)$$

Based on the optical flow equation, constant-brightness constraint (4) can be written as follows.

$$\Delta'_x \frac{\partial I(x,y)}{\partial x} + \Delta'_y \frac{\partial I(x,y)}{\partial y} \simeq I(x,y) - I'(x',y') \quad (17)$$

$$\Delta"_x \frac{\partial I(x,y)}{\partial x} + \Delta"_y \frac{\partial I(x,y)}{\partial y} \simeq I(x,y) - I"(x",y") \quad (18)$$

Figure 3:
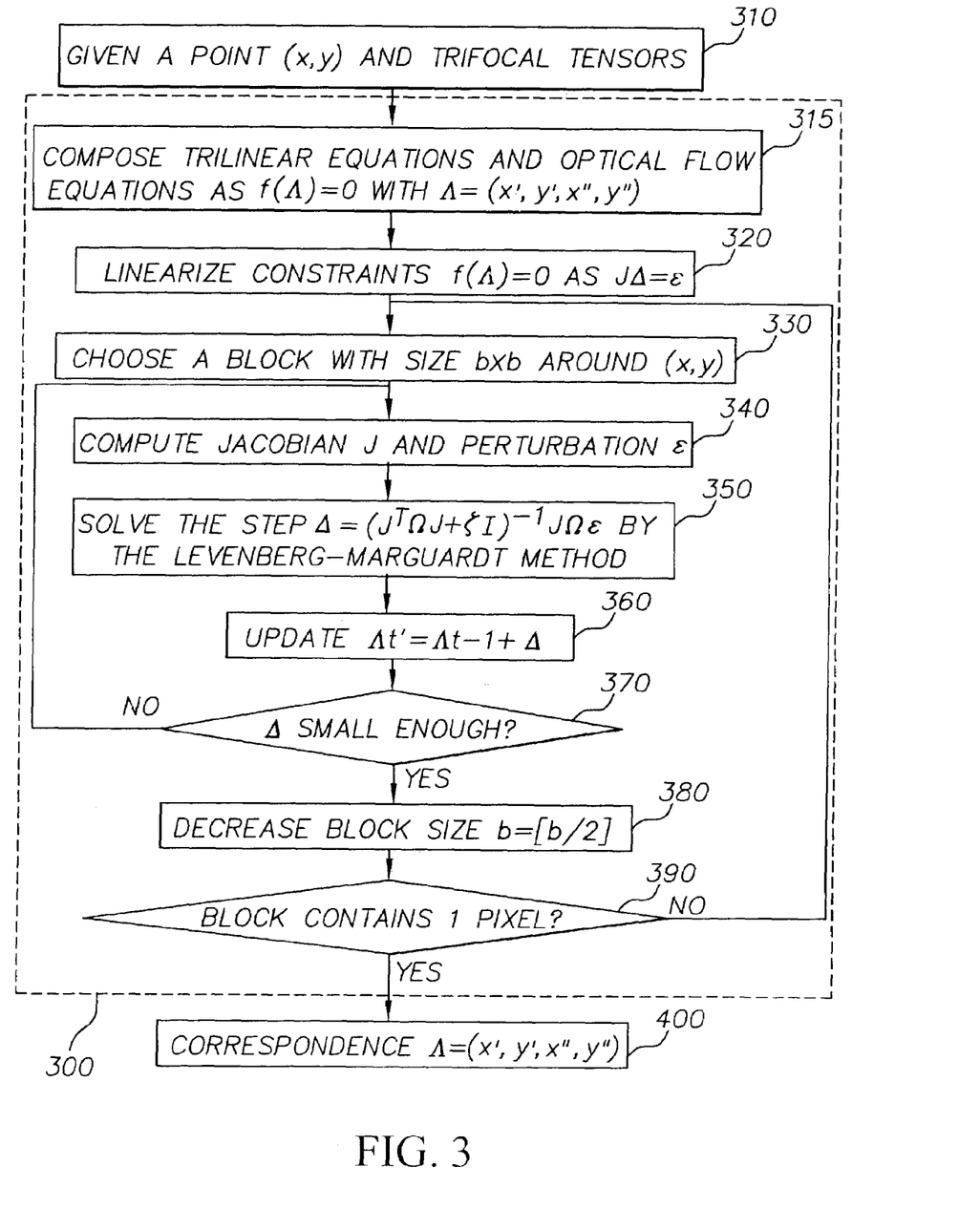
FIG. 3 shows the procedure to find the constraint-consistent corresponding points of $(x,y)$ on the other two frames $(x',y',x'',y'')$.

Now turn to FIG. 3 for the details of solving $f(\Lambda)=0$ for constraint-consistent corresponding points $\Lambda=(x', y', x", y")^T$ in frames $\psi'$ and $\psi"$. Given a point (x,y) on frame $\psi$ and the trifocal tensors 310, the procedure to find the corresponding points $\Lambda=(x', y', x", y")^T$ to frames $\psi'$ and $\psi"$ 400 is outlined in 300.

The geometric constraint of trilinearity and the constant-brightness constraint (5)–(18) provide a nonlinear over-determined system $f(\Lambda)=0$ for parameter $\Lambda=(x', y', x", y")$ at each point (x,y) in frame $\psi$. And motion estimation becomes a problem of parameter estimation of $\Lambda$ from $f(\Lambda)=0$, which can be linearized as a linear system in 320

$$J\Delta = \epsilon \quad (19)$$

Jacobian $$J = \frac{\partial f}{\partial \Lambda}$$

is the partial derivative of f with respect to Λ, and has the following form $$J = \begin{bmatrix} -x''T_i^{33}p^i + T_i^{31}p^i & 0 & T_i^{13}p^i - x'T_i^{33}p^i & 0 \\ -y''T_i^{33}p^i + T_i^{32}p^i & 0 & 0 & T_i^{13}p^i - x'T_i^{33}p^i \\ 0 & -x''T_i^{33}p^i + T_i^{31}p^i & T_i^{23}p^i - y'T_i^{33}p^i & 0 \\ 0 & -y''T_i^{33}p^i + T_i^{32}p^i & 0 & T_i^{23}p^i - y'T_i^{33}p^i \\ U_k^{13}p''^k - xU_k^{33}p''^k & 0 & x'U_1^{13} - x'xU_1^{33} + xU_1^{31} - U_1^{11} & x'U_2^{13} - x'xU_2^{33} + xU_2^{31} - U_2^{11} \\ 0 & U_k^{13}p''^k - xU_k^{33}p''^k & y'U_1^{13} - y'xU_1^{33} + xU_1^{32} - U_1^{12} & y'U_2^{13} - y'xU_2^{33} + xU_2^{32} - U_2^{12} \\ U_k^{23}p''^k - yU_k^{33}p''^k & 0 & x'U_1^{23} - x'yU_1^{33} + yU_1^{31} - U_1^{21} & x'U_2^{23} - x'yU_2^{33} + yU_2^{31} - U_2^{21} \\ 0 & U_k^{23}p''^k - yU_k^{33}p''^k & y'U_1^{23} - y'yU_1^{33} + yU_1^{32} - U_1^{22} & y'U_2^{23} - y'yU_2^{33} + yU_2^{32} - U_2^{22} \\ xV_1^{13} - xx''V_1^{33} + x''V_1^{31} - V_1^{11} & xV_2^{13} - xx''V_2^{33} + x''V_2^{31} - V_2^{11} & -xV_j^{33}p'^j + V_j^{31}p'^j & 0 \\ yV_1^{13} - yx''V_1^{33} + x''V_1^{32} - V_1^{12} & yV_2^{13} - yx''V_2^{33} + x''V_2^{32} - V_2^{12} & -yV_j^{33}p'^j + V_j^{32}p'^j & 0 \\ xV_1^{23} - xy''V_1^{33} + y''V_1^{31} - V_1^{21} & xV_2^{23} - xy''V_2^{33} + y''V_2^{31} - V_2^{21} & 0 & -xV_j^{33}p'^j + V_j^{31}p'^j \\ yV_1^{23} - yy''V_1^{33} + y''V_1^{32} - V_1^{22} & yV_2^{23} - yy''V_2^{33} + y''V_2^{32} - V_2^{22} & 0 & -yV_j^{33}p'^j + V_j^{32}p'^j \\ \sum_R \left(\frac{\partial I(x,y)}{\partial x}\right)^2 & \sum_R \frac{\partial I(x,y)}{\partial x}\frac{\partial I(x,y)}{\partial y} & 0 & 0 \\ \sum_R \frac{\partial I(x,y)}{\partial y}\frac{\partial I(x,y)}{\partial x} & \sum_R \left(\frac{\partial I(x,y)}{\partial y}\right)^2 & 0 & 0 \\ 0 & 0 & \sum_R \left(\frac{\partial I(x,y)}{\partial x}\right)^2 & \sum_R \frac{\partial I(x,y)}{\partial x}\frac{\partial I(x,y)}{\partial y} \\ 0 & 0 & \sum_R \frac{\partial I(x,y)}{\partial y}\frac{\partial I(x,y)}{\partial x} & \sum_R \left(\frac{\partial I(x,y)}{\partial y}\right)^2 \end{bmatrix} \quad (20)$$

$\Delta = (\Delta'_x, \Delta'_y, \Delta''_x, \Delta''_y)^T$ is the adjustment on Λ. And $\epsilon = -f(\Delta)$ is the approximation error, and can be written as $$\varepsilon = \begin{bmatrix} -f_1(x', x'') \\ -f_2(x', y'') \\ -f_3(x'', y') \\ -f_4(y'', y') \\ -f_5(x', x'', y'') \\ -f_6(y', x'', y'') \\ -f_7(x', x'', y'') \\ -f_8(y', x'', y'') \\ -f_9(x', y', x'') \\ -f_{10}(x', y', x'') \\ -f_{11}(x', y', y'') \\ -f_{12}(x', y', y'') \\ \sum_R \frac{\partial I(x,y)}{\partial x}(I(x,y) - I'(x', y')) \\ \sum_R \frac{\partial I(x,y)}{\partial y}(I(x,y) - I'(x', y')) \\ \sum_R \frac{\partial I(x,y)}{\partial x}(I(x,y) - I''(x'', y'')) \\ \sum_R \frac{\partial I(x,y)}{\partial y}(I(x,y) - I''(x'', y'')) \end{bmatrix} \quad (21)$$

where $f_1(*)$–$f_{12}(*)$ are the left sides of (5)–(16).

The first four rows of J in (20) are from the geometric constraint (5)–(8). When they are used alone, only the residue error (not the estimate error) can be corrected, and the solution is sensitive to the initial point. The next eight rows are from (9)–(16), not necessary if accurate $T_i^{jk}$ is available. The last four rows are from the constant-brightness constraint (17)–(18), where each optical flow equation is expanded into two equations with region support R. When they are used alone, it is like two independent block matching, between ψ and ψ' and between ψ and ψ''. It is the trilinear constraint that links these two motion fields together.

Although the constraints are valid at a single point, the region R in (20)–(21) is brought in for practical purposes: 1) capturing large motion; 2) alleviating the error sensitivity of the gradient estimate, especially in non-texture areas; and 3) offering hierarchical structure. In large or well textured regions, the constant-brightness constraint dominates and the trilinear constraint combines two independent block matching into a single optimization. In small or uniform regions, the geometric constraint dominates, and the residue error to the manifold in $R^4$ is minimized.

To this end, a block with size of b×b pixels around (x,y) 260 is chosen as the support region, and Jacobian J and perturbation ε are computed accordingly.

It is important to normalize (19) and (20) appropriately for numerical stability. Image coordinates (x,y), (x',y') and (x'',y'') are normalized as $$\bar{x} = c(2x/w - 1), \quad \bar{y} = c(2y/h - 1) \quad (22)$$

to limit the contribution of higher order terms (like xx'x'') to the overall error sensitivity. In (21), w and h are the image width and height, and constant c is chosen as c=1.8481. Image coordinates are linearly transformed to [−c, c], such that the average Euclidean distance of the image pixels to the image center is $\sqrt{2}$. Meanwhile, the range of intensity/color is normalized from [0,255] to [0,1], to limit the dynamic range of the gradients.

Furthermore, the linear approximation equation $J\Delta=\epsilon$ is revised as $$J^T\Omega J\Delta = J^T\Omega\epsilon \quad (23)$$

to balance the contributions of the constraints, avoiding one constraint always overdominating the other. $\Omega$ is a 16×16 weighting matrix chosen as $\Omega=\Sigma_\epsilon^{-1}$, the inverse covariance matrix of $\epsilon$.

For simplicity, we set $\Omega$ as a diagonal matrix $\Omega=\text{diag}\{1,\ldots 1,\alpha,\alpha,\alpha,\alpha\}$ and use $\alpha$ to control the relative emphasis of appearance versus geometry. Here $\alpha$ is equivalent to the Lagrange multiplier for the constrained optimization, and is chosen as $$\alpha(x,y)=\beta*2^{-t}*tr\{H_R(x,y)\}=\beta 2^{-t}(\lambda_1+\lambda_2) \quad (24)$$

where $\beta$ is a constant set heuristically, t is the iteration number in region R, and $H_R(x,y)$ is the Hessian matrix at point (x,y) in region R $$H_R(x,y) = \begin{bmatrix} \sum_R \left(\frac{\partial I(x,y)}{\partial x}\right)^2 & \sum_R \frac{\partial I(x,y)}{\partial x}\frac{\partial I(x,y)}{\partial y} \\ \sum_R \frac{\partial I(x,y)}{\partial y}\frac{\partial I(x,y)}{\partial x} & \sum_R \left(\frac{\partial I(x,y)}{\partial y}\right)^2 \end{bmatrix} \quad (25)$$

The eigenvalues of $H_R(x,y)$, $\lambda_1 \geq \lambda_2 \geq 0$, provide a measure of textureness in region R, two unique eigenvalues for a corner, one unique value for an edge, and all zeros for a uniform region. So $\alpha$ can be used to adapt the constraint emphasis between the well textured regions and the uniform regions. As the number of iteration t increases, so does the emphasis on the geometric constraint.

The linear approximation is refined by iterative estimation. It is necessary for two reasons: 1) (5)–(16) are nonlinear, and only the residue error of the starting point can be corrected; 2) (17) and (18) are good approximation for small motion only, and large motion has to be handled through iterations of successive frame warping. We use the Levenberg-Marguardt method 350 for better control of the step size and faster convergence. The basic idea is to adapt the step size of the iterated estimation by switching between Newton iteration for fast convergence and descent approach for decrease of cost function. The final solution of (23) is available as $$\Delta=(J^T\Omega J+\zeta I)^{-1}J\Omega\epsilon \quad (24)$$

where I is an identity matrix. The perturbation term $\zeta$ on the diagonal elements controls the step size, as large $\zeta$ yields small step size. $\zeta$ is decreased if the iteration leads to smaller $\epsilon$, and is increased otherwise. At iteration t, Jacobian J and $\epsilon$ are evaluated based on $(x'_{t-1}, y'_t, x''_{t-1}, y''_{t-1})$ and intensity/color I, I', I". The solution of (24) is then used to update the estimate $\Lambda_t=\Lambda_{t-1}+\Lambda_t$ 360. The iteration repeats until $\Delta_t$ is small enough, or it has reached the specified number of iterations 370. Afterwards, the size of the support region is decreased by half 380, and the process goes back 330, until the region contains only one pixel with b=1 390. $T_i^{jk}$, $U_k^{ij}$, $V_j^{ki}$, and (x,y) remain the same through out the iterations. The procedure usually converges within a few iterations.

Figure 4:
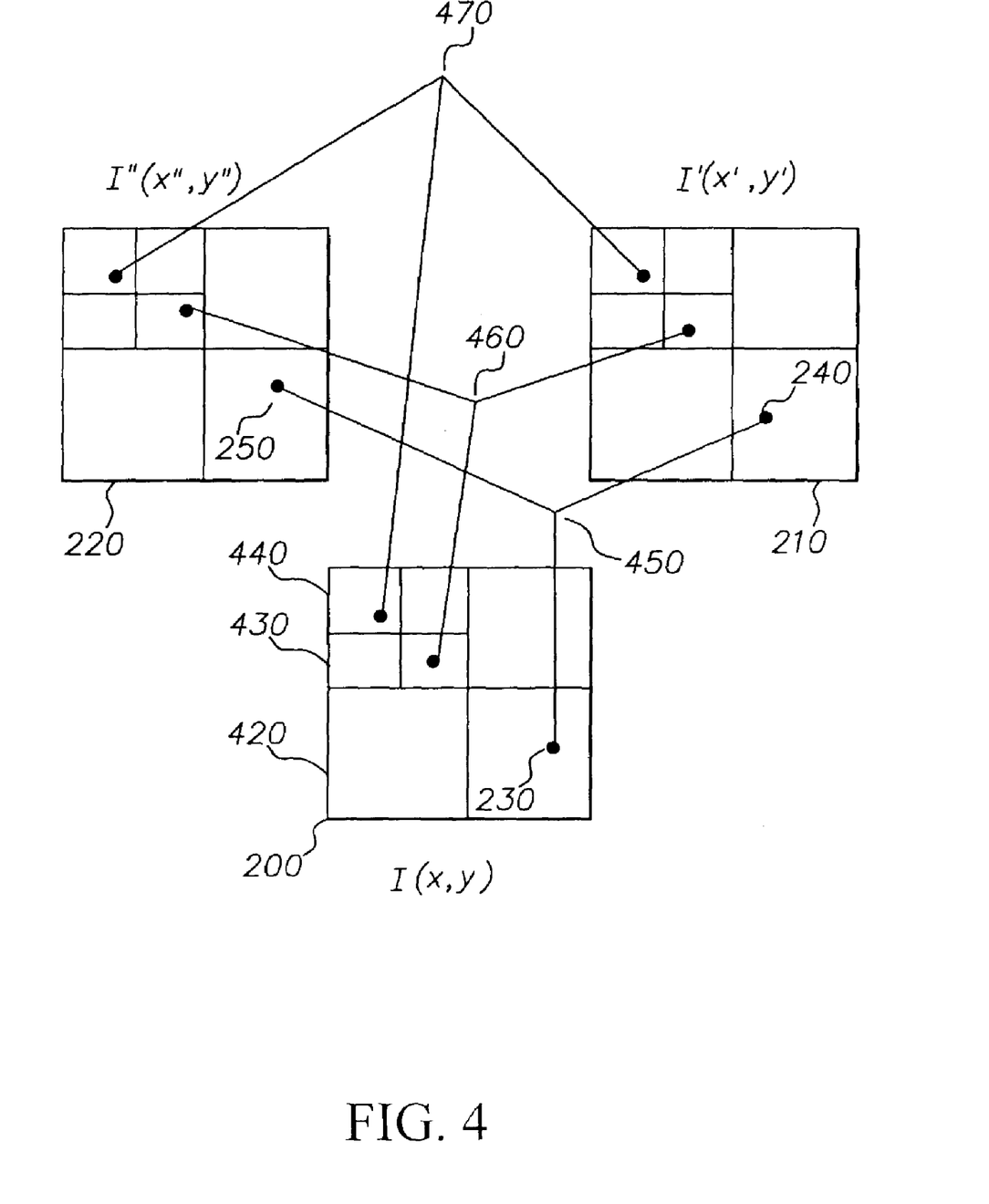
FIG. 4 shows point correspondence on a hierarchical and multi-resolution pyramid structure of three images.

Hierarchical structure is also employed to capture large motion, and improve gradient computation and numerical stability. The point correspondences on the hierarchical and multi-resolution pyramid structures of the three images are illustrated in FIG. 4. Three-level pyramid structures are shown. For example, the image I(x,y) 200 on level 0 420 has full resolution. The same image on level 1 430 has half the resolution, and that on level 2 440 has only a quarter resolution. In FIG. 4, the point correspondence of (x,y) on the three image on levels 0, 1, 2 are shown as 450, 460, and 470, respectively. Therefore, a small motion on a coarse resolution corresponds to a large motion on a fine resolution.

Figure 5:
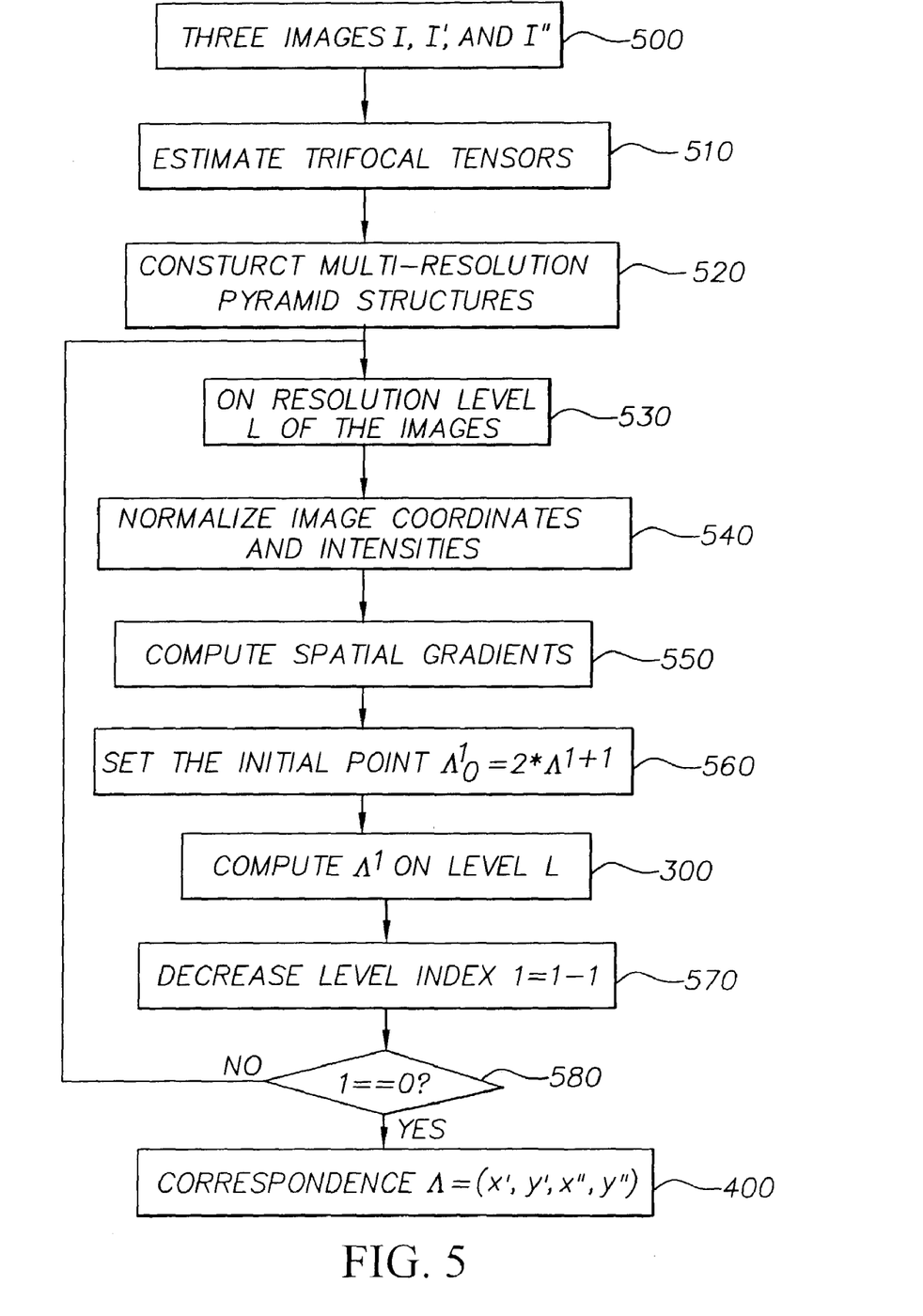
FIG. 5 shows a hierarchical and three-frame dense motion estimation scheme based on the trilinear constraint and the constant-brightness constraint.

Having presented the motion estimation of a single point in FIG. 3, we now turn to FIG. 5 for a hierarchical and three-frame dense motion estimation scheme based on the trilinear constraint and the constant-brightness constraint. "Dense" means it finds the corresponding points for every single point (x,y) on frame $\psi$. The hierarchical structure can capture large motion, and share the intermediate results across different pyramid levels to save computation cost.

In FIG. 5, the dense motion fields between three input images I, I', and I" 500 are computed at the same time. First, the trifocal tensor of the three images is estimated 510. The details will be laid out in FIG. 6. The trifocal tensor captures the camera motion and internal parameters. A multi-resolution pyramid structure is built up for each image 520, and motion estimation is carried out in a coarse-to-fine fashion. On resolution level l 530, normalize image coordinates and image intensity/color 540, and compute spatial gradients 550. The hierarchical structure has no effect on the trilinear constraints, due to the normalization (22). The process is repeated successively from the coarse to the fine levels, and the result at a coarse level is used as the starting point at a fine level. Set the initial point on level l $\Lambda^l_0=2*\Lambda^{l+1}$ based on the estimates on level l+1 560. Compute the correspondence $\Lambda$ on level l 300. The iteration of $\Lambda^l_t=\Lambda^l_{t-1}+\Delta^l_t$ continues with decreasing level index l until l=0, i.e., the motion fields on the full resolution images.

Figure 6:
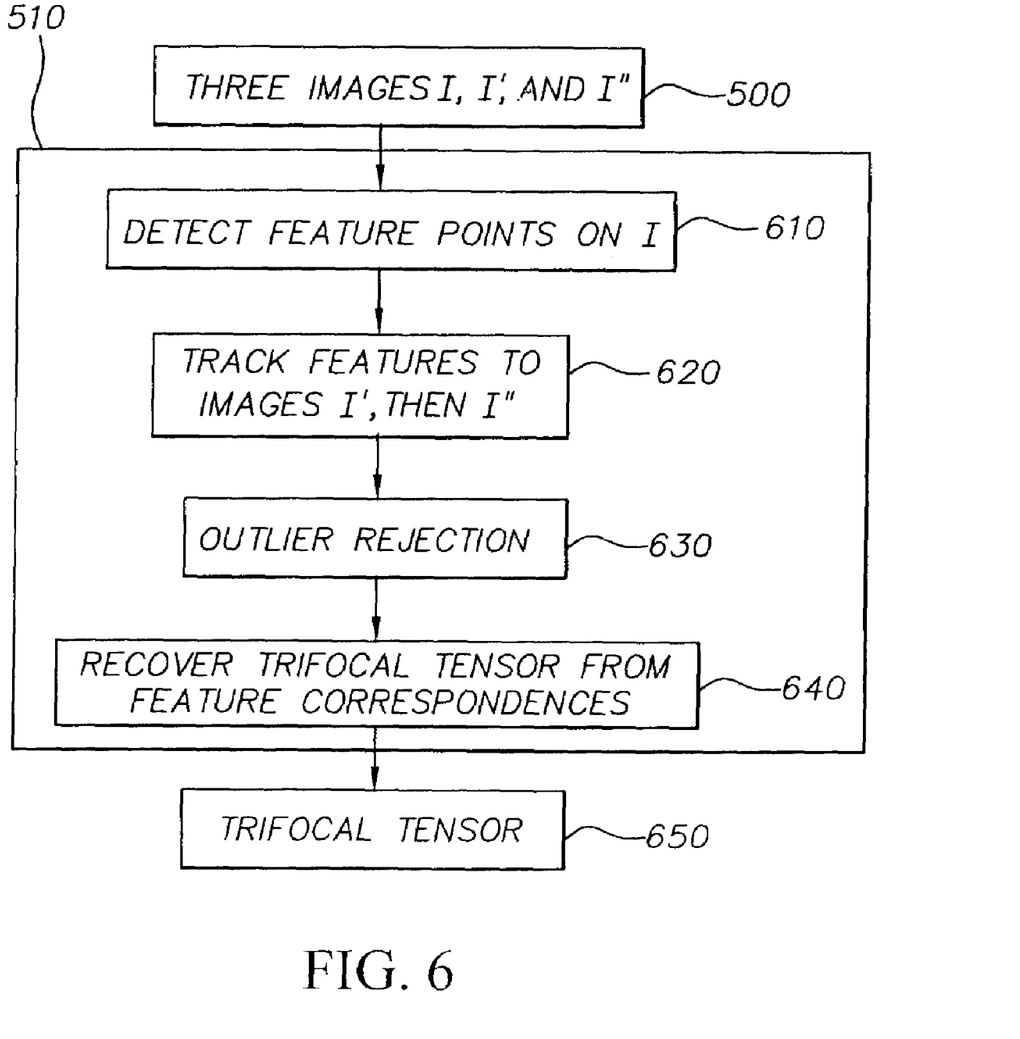
FIG. 6 shows the procedure to estimate a trifocal tensor from image content.

The step of trifocal tensor estimation 510 in the above hierarchical dense motion estimation algorithm is shown separately in FIG. 6. The input are the three images I, I', and I" 500. Features points, such as corners, are detected on image I 610. They are tracked to images I' and I" by feature tracking or matching 620. Due to the noise, there are some false feature correspondences (outliers). They are excluded from the tensor estimation by outlier rejection 630. The remaining stable correspondences are used to recover the trifocal tensor 640. The specific methods selected for such feature point detection, tracking and matching, and outlier rejection determinations as shown in FIG. 6 are well known to those of skill in this art, and will not be further described in the current disclosure.

The disclosure provides a unified 2-D/3-D approach to the geometry-consistent and the appearance-consistent motion estimation. The constraints (1–4) are valid for both 2-D and 3-D rigid scenes under perspective projection. And other motion estimation methods, such as 2-D translation or 2-D affine, can be derived as special cases. The epipolar constraints of $x^T F_{12} x'=0$ and $x^T F_{13} x''=0$ are also special cases, as the fundamental matrices can be derived from the trifocal tensor.

From an alternative perspective, it provides a manifold-plus-parallax approach to motion estimation. Trilinear equations (5–9) specify a manifold in $R^4$, best approximating the true displacement fields (x',y',x",y"). When the constant-brightness constraint is not effective, the dominant scene/camera motion is captured by the trifocal constraints, and only the residue error to the manifold can be corrected. If it is effective, then both the residue error and the estimate error can be minimized. This is somewhat analogous to the plane-plus-parallax formulation. The manifold-plus-parallax approach is potentially useful, as a manifold is more efficient for nonlinear approximation than a spatial plane.

Figure 7:
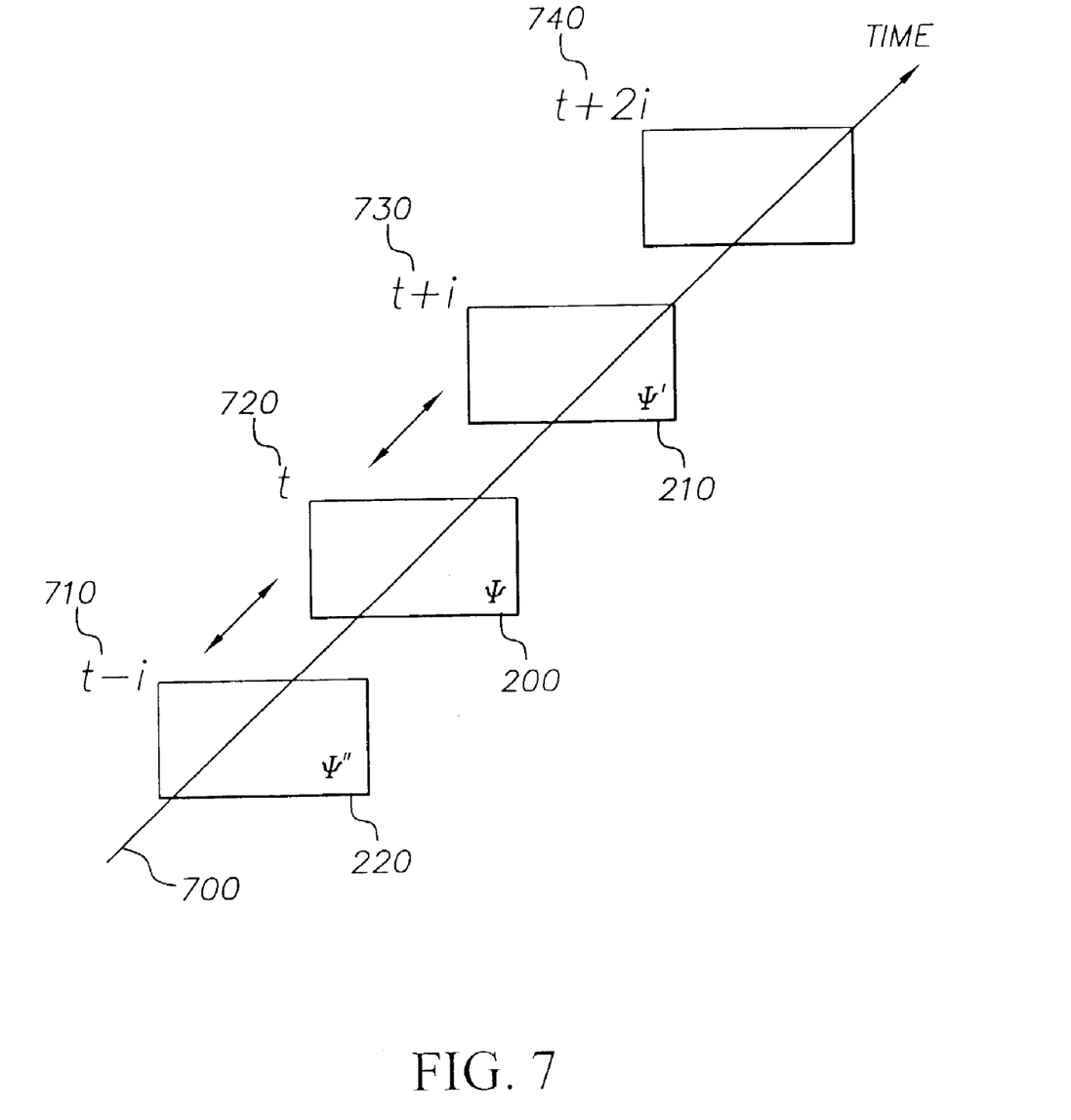
FIG. 7 shows a configuration of motion estimation in an image and a video sequence.

Now we turn to the application of the disclosed motion estimation method in image and video processing. A video sequence is a number of images with the same spatial resolution coherently arranged along the temporal dimension. Except for the start and the end frames, every frame has two temporally adjacent frames, before and after it. Motion estimation of video sequence is to find the motion fields between the video frames. Based on the current disclosed method, we can choose three frames from the video sequence, and arrange them as the configuration shown in FIG. 2, and find the dense motion fields between them in a single optimization. Of course, there are many possible ways to make the arrangements. One particular bi-directional configuration is shown in FIG. 7. A video sequence 700 has a number of frames sequentially arranged along the time line. The frame 720 at time instance t, the previous frame 710 at t−i, i=1, 2, 3 . . . , and the future frame 730 at t+i are chosen as a triplet, and dense motion fields between them can be computed using the disclosed method. For each pixel (x,y) in frame 720, its corresponding points (x',y') and (x",y") in frames 730 and 710 are estimated. On the next pass, frame 730 becomes the current frame. A new triplet of frame 730 with the future frame 740 and the previous frame 720 is formed. The dense motion between 720 and 730 estimated from triplet (720, 730, 710) can be used as a starting point for the motion estimation between frames 730, 740, and 720. Alternatively, the motion between 720 and 730 can be verified by the estimates from triplets (720, 730, 710) and (730, 740, 720). The estimated motion fields can be used in a wide variety of digital video processing applications, such as image alignment and registration, video filtering, video enhancement, motion compensation for video compression, image based rendering, and 3-D shape recovery.

Figure 8A:
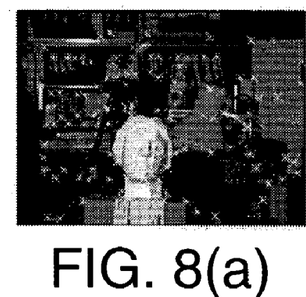
FIGS. 8A, 8B and 8C show three frames of a Head and Lamp sequence with detected features, in which dense motion fields from a frame ψ (b) to frames ψ' (c) and ψ" (a) are estimated.
Figure 8B:
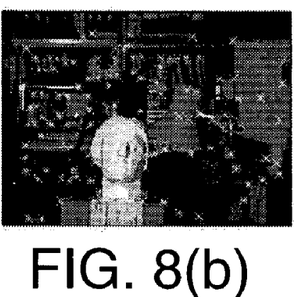
Figure 8C:
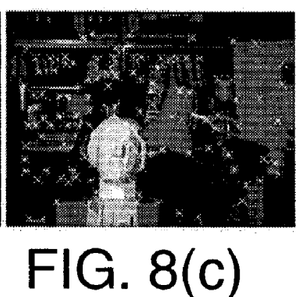

The disclosed method has been tested on three frames of the Head and Lamp sequence, as shown in FIG. 8. They are color images with spatial resolution of 384×288, and horizontal disparity ranging from 5 to 15 pixels. We take an uncalibrated approach without any prior information about scene structure and camera geometry (e.g., horizontal motion), and only use the image color/intensity to find the dense motion fields between the three images simultaneously.

Trifocal tensors $T_i^{jk}(\psi, \psi', \psi'')$, $U_k^{ij}(\psi'', \psi, \psi')$, and $V_j^{ki}(\psi', \psi'', \psi)$ are estimated automatically by random sampling from 136 reliable correspondences. The precision of the trifocal tensors is verified by the match between the trifocal transferred points (green pluses) and the detected points (yellow crosses) in FIG. 8.

Figure 9A:
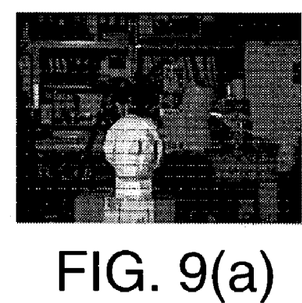
FIG. 9A shows motion vectors from frames ψ (FIG. 8B) to ψ' (FIG. 8C)
Figure 9B:
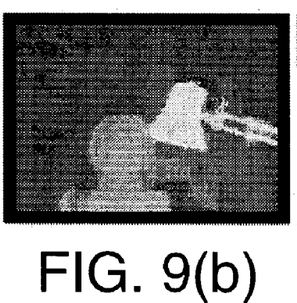
FIG. 9B shows the x motion component from frames ψ to ψ' as a depth map.
Figure 9C:
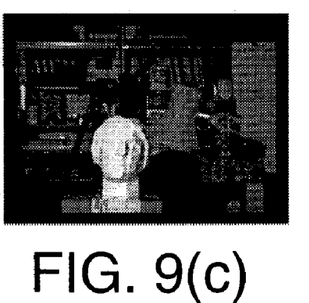
FIG. 9C shows backward motion compensated frame ψ from frame ψ based on the estimated motion field.

The motion estimation results between $\psi$ (FIG. 8(b)) and $\psi'$ (FIG. 8(c)) are shown in FIG. 9. The other motion fields, between $\psi$ and $\psi''$ and between $\psi'$ and $\psi''$, have similar results. The motion vectors from $\psi$ to $\psi'$ are shown in FIG. 9(a). The horizontal motion is dominant, and the vertical motion is small, noisy and close to 0. As an alternative presentation, the horizontal component of the motion field is shown in FIG. 9(b) as a depth map. The bright (dark) regions have large (small) motion and are close to (further away from) the camera. The backward motion compensated frame $\psi$ from frame $\psi'$ based on the estimated motion field is shown in FIG. 9(c).

The estimated motion fields are close to the ground truth, as shown in the depth map and the motion compensated results. And such results cannot be achieved by only using the constant-brightness constraint or only using the trilinear constraint.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

110 System
112 Microprocessor-based Unit
114 Display
116 Keyboard
118 Mouse; input device
120 Selector on display
122 Disc drive unit
124 Compact disc-read only memory
125 External network
126 Floppy disk
128 Printer
130 PC card
132 PC card reader
134 Digital camera
136 Digital camera docking port
138 Cable connection
140 Wireless connection
200 Input image I(x,y) as frame $\psi$
210 Input image I'(x',y') as frame $\psi'$
220 Input image I"(x",y") as frame $\psi''$
230 A point p=(x,y) on frame $\psi$
240 The corresponding point p'=(x',y') on frame $\psi'$
250 The corresponding point p"=(x",y") on frame $\psi''$
260 Bounding box around point (x,y)
270 Trifocal tensor $T_i^{jk}(\psi, \psi', \psi'')$
280 Trifocal tensor $U_k^{ij}(\psi'', \psi, \psi')$
290 Trifocal tensor $V_j^{ki}(\psi', \psi'', \psi)$
300 Compute correspondence $\Lambda$=(x',y',x",y") for point (x,y)
310 A point (x,y) and trifocal tensors
315 Compose trilinear equations and optical flow equations as $f(\Lambda)=0$
320 Linearize constraints $f(\Lambda)=0$ as $J\Delta=\epsilon$
330 Choose a block with size b×b around (x,y)
340 Compute Jacobian J and perturbation E
350 Solve $\Delta$ by the Levenberg-Marguardt method
360 Update the estimate $\Lambda_t=\Lambda_{t-1}+\Delta$
370 Check the termination condition, is $\Delta$ small enough?
380 Decrease the block size by half
390 Check if the block contains only one pixel, i.e., b=1
400 The corresponding points $\Lambda$=(x',y',x",y") in frames $\psi'$ and $\psi''$
420 Image at level 0 with full resolution
430 Image at level 1 with half resolution
440 Image at level 2 with quarter resolution
450 The corresponding points on three images at level 0
460 The corresponding points on three images at level 1
470 The corresponding points on three images at level 2
500 Input images I, I', and I"
510 Estimate trifocal tensors
520 Construct multi-resolution pyramid structures
530 On resolution level L of the images
540 Normalize image coordinates and intensities
550 Compute spatial gradients
560 Set the initial point $\Lambda_0^l=2*\Lambda^{l+1}$
570 Compute $\Lambda^l$ on level L 580 Decrease level index l=l−1
590 Check if the images are on level 1 with full resolution
610 Detect feature points on image I
620 Track features to images I', then I"
630 Outlier rejection
640 Recover trifocal tensor from feature correspondences
650 Trifocal tensor
700 Image/video sequence
710 A frame at time instance t−i, i=1, 2, 3 . . .
720 An image frame at time instance t
730 A frame at time instance t+i, i=1, 2, 3 . . .
740 A frame at time instance t+2i,i=1, 2, 3 . . .

What is claimed is:

1. A method for determining motion vectors from one point in one image frame of a scene to corresponding points in at least two other image frames of the scene, utilizing one or more cameras, said method comprising the steps of:
    providing first, second, and third images of a scene under perspective projection with unconstrained motion of the one or more cameras, wherein points (x',y') and (x",y") in the second and third frames are projections of the same spatial points (x,y) in the first frame;
    specifying a system of trifocal tensors and optical flow equations that describe point correspondence across the three images; and
    applying both a geometric constraint of trilinearity and an appearance constraint of constant brightness, thereby utilizing a trilinear constraint and a constant brightness constraint to obtain the pointwise displacement between the three frames simultaneously;
    wherein said providing further comprises capturing said first, second, and third images with said one or more cameras.

2. The method of claim 1 wherein the step of applying both a geometric constraint of trilinearity and an appearance constraint of constant brightness is comprised of the steps of:
    (a) composing a system of trilinear equations and optical flow equations as an over-determined nonlinear system f(Λ)=0, with Λ=(x',y',x",y");
    (b) linearizing constraints f(Λ)=0 as JΔ=ϵ, with J as a Jacobian matrix, Δ as an adjustment on Λ, and ϵ as a perturbation error;
    (c) choosing a block with size b×b pixels around point (x,y) as a support region;
    (d) computing the Jacobian J and the perturbation ϵ;
    (e) solving Δ by the Levenberg-Marguardt method;
    (f) updating the estimate $\Lambda_t = \Lambda_{t-1} + \Delta$;
    (g) repeating steps (d) to (f) until the adjustment Δ is small enough, or a pre-specified number of iterations has been reached;
    (h) repeating steps (d) to (f) for regions around (x,y) until b=1 and the region contains one pixel; and
    (i) using the final estimate of point correspondence Λ=(x', y',x",y") to specify the pointwise displacement between the three frames.

3. The method of claim 1 wherein the constraints are from different modalities, geometry and appearance respectively, and are used in a single optimization for constraint-consistent motion estimation.

4. The method of claim 2 wherein four independent trilinear equations and two optical flow equations are integrated in an over-determined system at each point (x,y) for four unknown variables (x',y',x",y"), thus alleviating aperture and motion blurring problems.

5. The method of claim 1 provides a manifold-plus-parallax approach to motion estimation, wherein the trilinear constraint specifies a manifold in $R^4$ best approximating the corresponding points (x',y',x",y"), and the constant-brightness constraint helps to alleviate the dependence on the initial points.

6. The method of claim 1 as being applicable to both 2-D and 3-D scenes under perspective projections, wherein 2-D motions include translational motion, affine motion, and perspective motion, and wherein a fundamental matrix based on epipolar geometry between two image frames can also be derived from the trifocal tensor between the three image frames.

7. The method of claim 1 wherein the camera is uncalibrated with unknown parameters, and the scene under imaging undergoes unconstrained rigid motion.

8. The method of claim 1 wherein three sets of trilinear constraints and three trifocal tensors $T_i^{jk}(\psi, \psi', \psi'')$, $U_k^{ij}(\psi'', \psi, \psi')$, and $V_j^{ki}(\psi', \psi'', \psi)$ are employed in a single optimization to overcome potential system bias.

9. The method of claim 1 wherein color information is used in addition to the brightness or image intensity.

10. The method of claim 2 wherein the support region around (x,y) is used to capture large motion and alleviate error sensitivity of gradient estimates, especially in nontexture areas.

11. The method of claim 2 wherein the image coordinates (x,y), (x',y') and (x",y") are normalized such that an Euclidean distance of the image pixels to an image center is $\sqrt{2}$.

12. The method of claim 11 wherein the normalization is carried out to balance the contributions from geometry and appearance, such that no constraint always over-dominates the other.

13. The method of claim 2 wherein eigenvalues of a Hessian matrix are used to determine constraint emphasis.

14. The method of claim 2 wherein the nonlinear system is solved by an iterative scheme.

15. A computer storage medium having instructions stored therein for causing a computer to perform the method of claim 1.

16. A computer storage medium having instructions stored therein for causing a computer to perform the method of claim 2.

17. The method of claim 2, further comprising a hierarchical and multi-resolution dense motion estimation method to find geometric-consistent and appearance-consistent motion fields across the three images simultaneously, comprising the steps of:
    (a) providing three input images I, I', and I";
    (b) estimating the trifocal tensors between the three input images;
    (c) constructing hierarchical and multi-resolution pyramid structures for the three images, wherein the resolution levels of the structures run from a coarse to a fine, or full, resolution level;
    (d) beginning with a coarse level, normalizing image coordinates and intensities of the images;
    (e) computing spatial gradients of the normalized images;
    (f) selecting an initial point $\Lambda_0$;
    (g) given the point $\Lambda_0$, solving for the point correspondence Λ;
    (h) repeating steps (d) to (g) for progressively finer resolutions until the full resolution is obtained in a coarse-to-fine sequence, wherein for each repetition of step (f) an initial point $\Lambda_0$ is selected using the initial point result $\Lambda_0$ from the previous level;
    (i) finding the dense motion fields between three images on a specific pyramid level; and (j) finding the dense motion fields between three images on the full resolution.

18. The method of claim 17 wherein the dense motion fields between the three image frames are computed simultaneously.

19. The method of claim 17 further comprising the steps of feature detection, feature tracking or matching, and outlier rejection, wherein the trifocal tensor is estimated from reliable feature correspondences obtained across the three images after application of the preceding steps of feature detection, feature tracking or matching, and outlier rejection.

20. The method of claim 17 wherein the three input images are selected from a digital image or video sequence.

21. The method of claim 17 wherein the three input images are selected from a digital image or video sequence in a bi-directional configuration.

22. A computer storage medium having instructions stored therein for causing a computer to perform the method of claim 17.

23. A system for determining motion vectors from one point in one image frame of a scene to corresponding points in at least two other image frames of the scene, wherein the frames are obtained in a capture process utilizing one or more cameras, said system comprising:

means for obtaining first, second and third images of a scene under perspective projection with unconstrained motion of the camera, wherein points (x',y') and (x",y") in the second and third frames are projections of the same spatial points (x,y) in the first frame; and a processor for specifying a system of trifocal tensors and optical flow equations that describe point correspondence across the three images and for applying both a geometric constraint of trilinearity and an appearance constraint of constant brightness, thereby utilizing a trilinear constraint and a constant brightness constraint to obtain the pointwise displacement between the three frames simultaneously.

24. The system as claimed in claim 23 wherein the pointwise displacement obtained between the three frames is used for at least one of image alignment and registration, video filtering, video enhancement, motion compensation for video compression, image based rendering, and 3-D shape recovery.

25. The system of claim 23 wherein the three images are selected from a digital image or video sequence.

26. The system of claim 23 wherein the three images are selected from a digital image or video sequence in a bi-directional configuration.

* * * * *